(12) United States Patent
Miller et al.

(10) Patent No.: US 9,701,175 B2
(45) Date of Patent: Jul. 11, 2017

(54) HYBRID VEHICLE SPLIT EXHAUST SYSTEM WITH EXHAUST DRIVEN ELECTRIC MACHINE AND A/C COMPRESSOR

(71) Applicant: Ford Global Technologies, LLC, Dearborn, MI (US)

(72) Inventors: Kenneth James Miller, Canton, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/685,703

(22) Filed: Apr. 14, 2015

(65) Prior Publication Data

US 2016/0303946 A1    Oct. 20, 2016

(51) Int. Cl.
| | |
|---|---|
| *B60H 1/32* | (2006.01) |
| *B60L 11/02* | (2006.01) |
| *B60W 10/08* | (2006.01) |
| *B60W 10/30* | (2006.01) |
| *B60W 20/00* | (2016.01) |
| *F01N 5/04* | (2006.01) |

(52) U.S. Cl.
CPC ......... *B60H 1/3208* (2013.01); *B60H 1/3222* (2013.01); *B60L 11/02* (2013.01); *B60W 10/08* (2013.01); *B60W 10/30* (2013.01); *B60W 20/00* (2013.01); *F01N 5/04* (2013.01); *B60H 2001/3238* (2013.01); *Y10S 903/93* (2013.01)

(58) Field of Classification Search
CPC .... B60K 13/04; B60K 13/101; B60K 13/108; B60K 6/445; B60K 6/448; B60W 20/00; B60W 10/08; B60W 10/26; B60W 2710/08; B60W 10/02; B60W 10/196; Y02T 10/47; Y02T 10/54; Y02T 10/6286; F01N 9/00; F01N 2590/11; B60L 2270/12
USPC ......... 701/22, 36; 180/65.265, 65.21, 65.28; 903/930
See application file for complete search history.

(56) References Cited

U.S. PATENT DOCUMENTS

| | | |
|---|---|---|
| 8,539,770 B2 | 9/2013 | Williams |
| 2001/0039290 A1* | 11/2001 | Regan ................. C07D 231/40 514/381 |
| 2012/0234614 A1 | 9/2012 | Theobald et al. |
| 2012/0273288 A1 | 11/2012 | Yamazaki et al. |
| 2014/0103761 A1* | 4/2014 | Atkins ................. B60K 6/105 310/74 |

(Continued)

*Primary Examiner* — Marthe Marc-Coleman
(74) *Attorney, Agent, or Firm* — David Kelley; Brooks Kushman P.C.

(57) ABSTRACT

A hybrid vehicle includes an exhaust turbine disposed in an exhaust path coupled to an electric machine and a compressor for an air-conditioning system. The vehicle includes a controller that controls the electric machine based on a difference between the power demand of the compressor and the power generated by the exhaust turbine. The electric machine may operate as a motor or a generator based on the difference. The vehicle may include a first clutch coupled to the electric machine and the compressor. The vehicle may include a second clutch coupled between the exhaust turbine and the electric machine. The controller may control the clutches based on the power demand and the power generated.

16 Claims, 2 Drawing Sheets

(56) References Cited

U.S. PATENT DOCUMENTS

2015/0135863 A1* 5/2015 Dalum ................... B60K 25/00
74/11
2016/0016577 A1* 1/2016 Holmes ................. B60W 10/08
701/22

* cited by examiner

HYBRID VEHICLE SPLIT EXHAUST SYSTEM WITH EXHAUST DRIVEN ELECTRIC MACHINE AND A/C COMPRESSOR

TECHNICAL FIELD

This application generally relates to powering a compressor for an air-conditioning system for a hybrid-electric vehicle.

BACKGROUND

A hybrid-electric vehicle (HEV) includes an engine to provide power for propulsion and accessories. The HEV may include one or more electric machines powered by a traction battery to provide power for propulsion and accessories. During operation, the engine may drive the electric machines to charge the traction battery. The traction battery may then be discharged to drive the electric machines or other accessories. One accessory is an air-conditioning (A/C) compressor to provide cabin cooling. The A/C compressor may be driven by an electric machine that draws power from the traction battery. Electrical power for the A/C compressor is supplied by the traction battery or the electric machine driven by the engine. The power flow between the engine and the traction battery includes opportunities for losses. Efficiency of the electric machines, power electronics, and losses in the traction battery affect the amount of energy that is stored.

SUMMARY

A vehicle includes at least one controller programmed to operate an electric machine mechanically coupled to a compressor and mechanically coupled to a turbine disposed within a path of a split-exhaust system of an engine according to a difference between a power demand of the compressor and a power generated by the turbine. The controller may be further programmed to, in response to the difference being positive, operate the electric machine as a motor to drive the compressor. The controller may be further programmed to, in response to the difference being negative, operate the electric machine as a generator to absorb power from the turbine to generate electrical power.

The controller may be further programmed to operate a clutch that couples the electric machine to the compressor based on a requested power demand of the compressor. The controller may be further programmed to, in response to the requested power demand being zero, disengage the clutch. The controller may be further programmed to, in response to the power demand being greater than zero when the engine is in a shutdown condition, disengage a clutch between the turbine and the electric machine. The power demand may be based on a pressure of an air conditioning system.

A vehicle includes an electric machine coupled to a compressor and an exhaust turbine that is driven by exhaust of an engine. The vehicle includes a controller programmed to, in response to the engine being in an auto-stop condition, operate the electric machine to drive the compressor and, in response to a power demand of the compressor being zero while the engine is running, operate the electric machine to generate electric power.

The controller may be further programmed to, in response to a power demand of the compressor being greater than a power output by the exhaust turbine, operate the electric machine to drive the compressor based on a difference between the power demand and the power output. The controller may be further programmed to, in response to a power demand of the compressor being less than a power output by the exhaust turbine, operate the electric machine to generate electric power based on a difference between the power output and the power demand.

The vehicle may further include a clutch configured to couple the electric machine to the compressor. The controller may be further programmed to operate the clutch based on the power demand for the compressor. The controller may be further programmed to, in response to the power demand being greater than zero, engage the clutch.

The vehicle may further include a clutch configured to couple the exhaust turbine to the electric machine, wherein the controller is further programmed to engage the clutch in response to the engine running The controller may be further programmed to disengage the clutch in response to the engine stopping. The controller may be further programmed to, in response to a state of charge of a traction battery that is coupled to the electric machine being greater than a predetermined threshold, disengage the clutch.

A method includes commanding, by a controller, a torque of an electric machine that is coupled between an exhaust turbine and a compressor based on a difference between a power demand of the compressor and a power generated by the exhaust turbine. The method further includes operating the electric machine according to the commanded torque.

The torque may cause the electric machine to operate as a motor to drive the compressor in response to the power demand being greater than the power generated. The torque may cause the electric machine to operate as a generator to convert the difference to electrical energy in response to the power demand being less than the power generated.

The method may further include operating, by the controller, a clutch between the electric machine and the compressor based on the difference. The method may further include operating, by the controller, a clutch between the exhaust turbine and the compressor based on the power generated by the exhaust turbine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
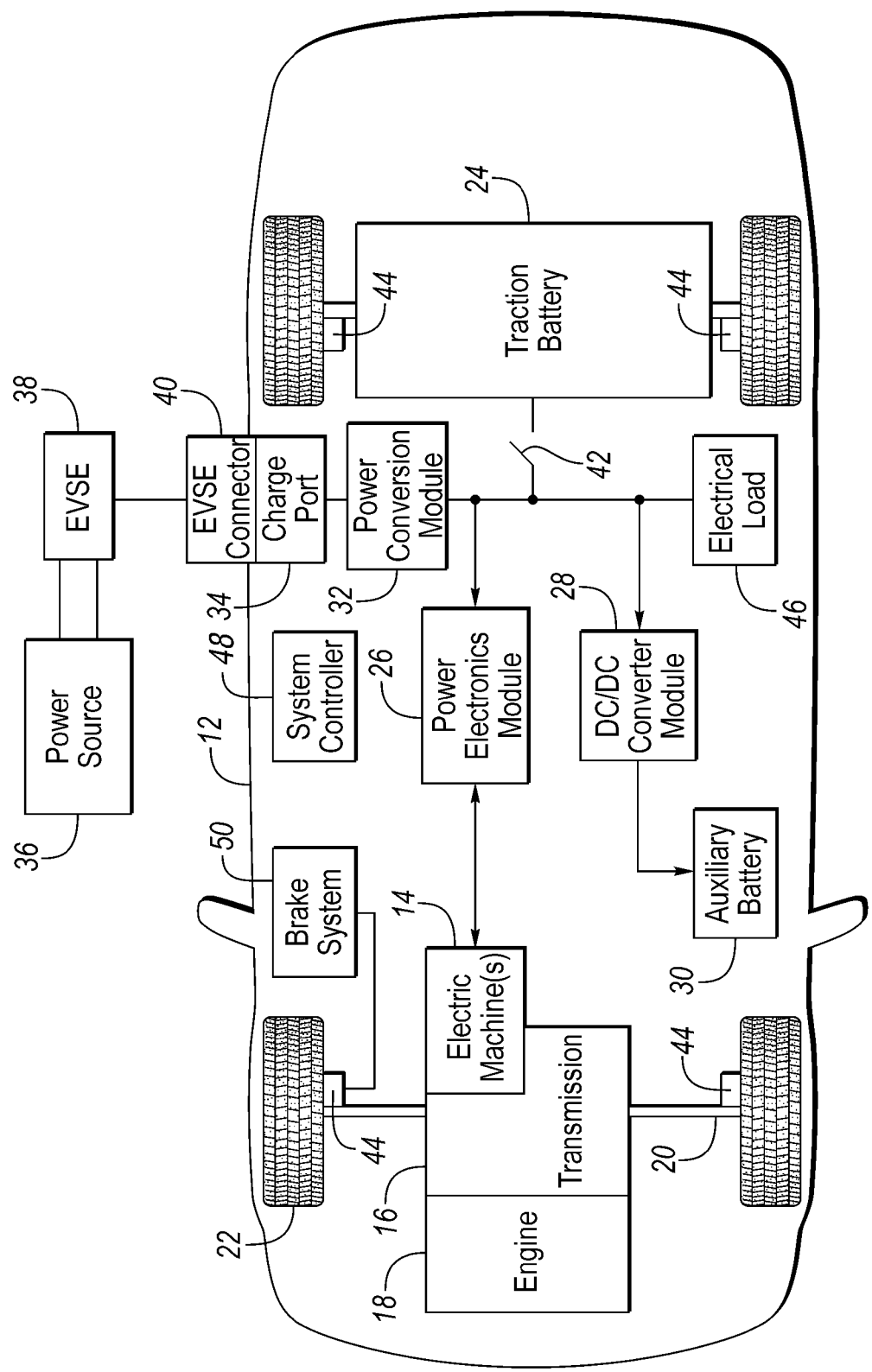
FIG. 1 is a diagram of a hybrid vehicle illustrating typical drivetrain and energy storage components.

FIG. 1 depicts a typical plug-in hybrid-electric vehicle (PHEV), although a conventional hybrid-electric vehicle (HEV) is equally relevant for the concepts disclosed herein. A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain may include those components that generate torque and deliver that torque to a surface of the road to propel the vehicle. The powertrain may include the engine 18, the hybrid transmission 16, the drive shaft 20, and the electric machines 14.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a typical traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage required by the traction battery 24.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically connected to the auxiliary battery. Other high-voltage loads 46, such as compressors and electric heaters, may be coupled to the high-voltage output of the traction battery 24.

The vehicle 12 may be a plug-in hybrid vehicle in which the traction battery 24 may be recharged by an external power source 36. The external power source 36 may be a connection to an electrical outlet. The external power source 36 may be an electrical power distribution network or grid as provided by an electric utility company. The external power source 36 may be electrically coupled to a charger or electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

In some configurations, one of the electrical loads 46 may be an air-conditioning (A/C) compressor that is driven by an accessory electric motor. The accessory electric motor may be controlled by an accessory power electronics module that converts the traction battery voltage to a current waveform to drive the electric motor. During vehicle operation, the primary source of energy for the traction battery may be the engine 18. The power flow path between the engine 18 and the traction battery 24 includes various sources of power loss. A first source of loss may be power loss in the propulsion electric machine 14 due to efficiency in converting mechanical energy from rotation of the engine 18 into electrical energy. A second source of loss may be power loss due to the efficiency of the power electronics module 26 in converting energy between the electric machine 14 and the traction battery 24. A third source of loss may be within the traction battery 24. Internal resistance of the traction battery 24 may cause power loss when charging and discharging the traction battery 24. Additionally, similar losses will be incurred by the accessory power electronics module and the accessory electric motor associated with the A/C compressor. These losses lead to decreased fuel economy when there is A/C demand.

One way to avoid these conversion losses may be to configure the A/C compressor to be driven directly from the engine 18 as a conventional non-hybrid vehicle operates. However, this configuration does not permit A/C compressor operation while the engine is not running, which may occur often in a hybrid-electric vehicle. Such a configuration may cause the engine to be restarted due to demand for cabin cooling when the vehicle is stopped resulting in lower fuel economy.

Figure 2:
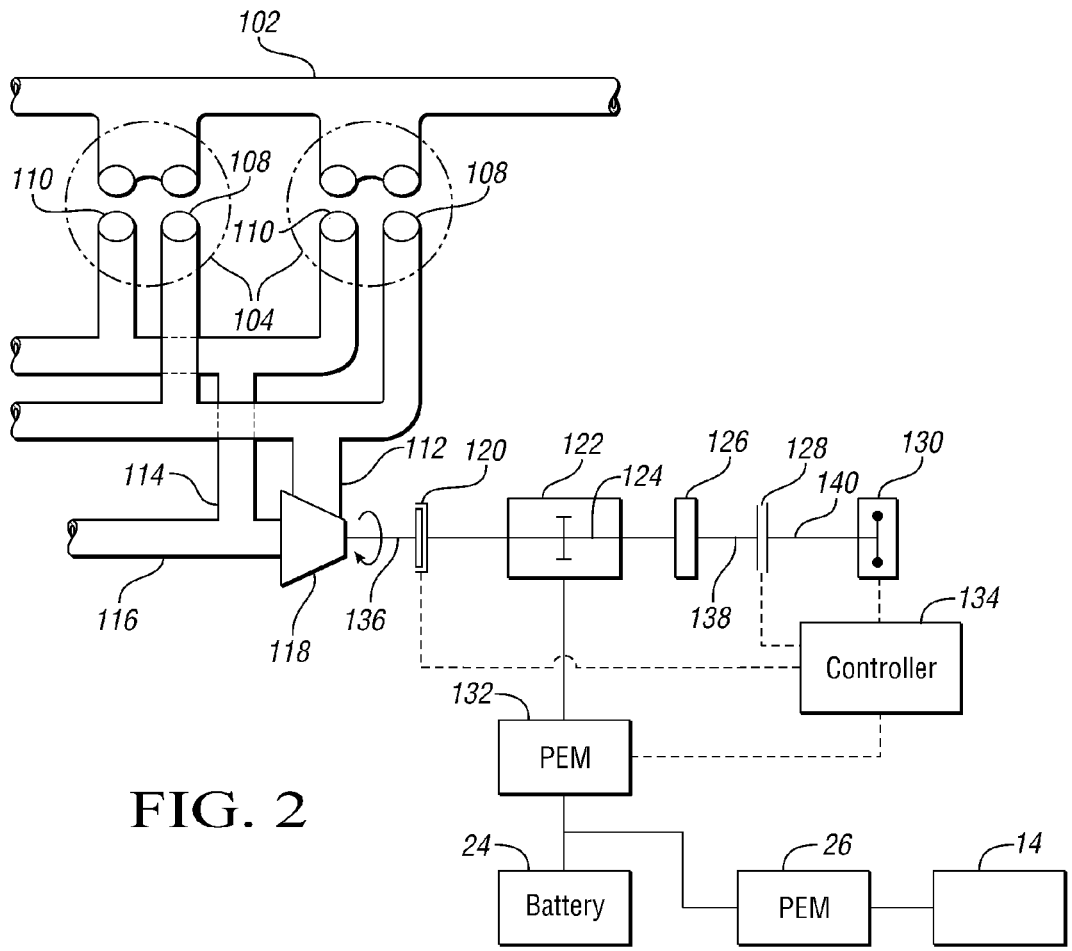
FIG. 2 is a diagram of a vehicle including an exhaust turbine configured to drive an electric machine and a compressor.

FIG. 2 depicts a possible improved configuration for driving the A/C compressor 130 with an accessory electric machine 122 and an exhaust gas turbine 118. The A/C compressor 130 may be driven by the accessory electric machine 122 that includes a pass-through shaft that is also driven by the exhaust gas turbine 118. Such a configuration combines the benefits of both electrical operation and mechanical operation. The improved configuration eliminates some of the losses incurred by the mechanical-electrical-mechanical conversion process of the electric-only configuration.

FIG. 2 depicts one possible configuration of a system that recovers energy from exhaust gas flow of the engine 18. The engine 18 may include a number of combustion chambers or cylinders 104 into which air and fuel are injected. An intake manifold 102 may be coupled to the cylinders 104 via one or more intake ports. Each intake port may supply air and/or fuel from the intake manifold 102 to the cylinders 104. The supply of air and/or fuel may be controlled by intake valves 106 that are configured to open and close the intake ports. The injected air and fuel are compressed in the cylinder 104 by a piston and a spark is created to cause combustion and move the piston. The cylinder 104 may have one or more exhaust ports to vent exhaust gases through an exhaust system.

The exhaust system may be a split-exhaust system in which more than one exhaust path is available to vent exhaust gases from the engine 18. The cylinder 104 may be coupled to one or more exhaust ports configured to exhaust combustion gases from the cylinder 104. Exhaust valves 108, 110 associated with the exhaust ports may control the flow of exhaust through the exhaust ports by sealing and unsealing the exhaust ports. A first exhaust valve 108 may control a flow of exhaust gas to a first exhaust manifold 112. A second exhaust valve 110 may control a flow of exhaust gas to a second exhaust manifold 114. In some configurations, the flow of exhaust gas through the first exhaust valve 108 and the second exhaust valve 110 may be routed to the same exhaust manifold. The engine of FIG. 2 depicts two cylinders to demonstrate the general configuration. The arrangement depicted may be extended to any number of cylinders.

Operation of the exhaust valves 108, 110 may be coordinated with the combustion cycle of the cylinder 104. Timing for opening and closing the exhaust valves 108, 110 may be controlled by a camshaft. Various techniques of achieving variable valve timing in conjunction with the camshaft may be implemented. The concepts disclosed are not dependent on the particular implementation to achieve variable valve timing and as such, there is no intent to limit the implementation to a particular implementation. The purpose of the variable valve timing may be to adjust the timing and flow of exhaust gas through the first exhaust manifold 112 for reasons to be described herein. The variable valve timing may be configured to adjust the amount and timing of exhaust gas flow through the first exhaust manifold 112 and the second exhaust manifold 114.

The first exhaust manifold 112 may include an exhaust turbine 118 coupled to an exhaust turbine shaft 136. Exhaust gas flowing past the exhaust turbine 118 may cause the exhaust turbine shaft 136 to rotate. The exhaust turbine shaft 136 may rotate at a speed that depends on a flow rate of exhaust gas past the exhaust turbine 118. The flow rate of exhaust gas may be impacted by a pressure difference across the exhaust turbine 118. The pressure difference and flow rate may be affected by engine speed and exhaust valve timing. The exhaust turbine shaft 136 may be coupled to a turbine clutch 120. The turbine clutch 120 may also be coupled to an electric machine shaft 124. The turbine clutch 120 may be configured to couple and decouple the exhaust turbine shaft 136 and the electric machine shaft 124. When decoupled, the electric machine shaft 124 may be rotated without rotating the exhaust turbine shaft 136. In some configurations, the turbine clutch 120 may be a one-way clutch. In some configurations, the turbine clutch 120 may be a controllable clutch that may be coupled and decoupled via an actuator that may be actuated by a controller.

The vehicle may further include the accessory electric machine 122 having an associated rotor and stator. The accessory electric machine shaft 124 may be coupled to the rotor of the accessory electric machine 122. The accessory electric machine shaft 124 may be a pass-through shaft that passes through the accessory electric machine 122. The accessory electric machine 122 may be electrically coupled to an accessory power electronics module 132. The accessory power electronics module 132 provides the ability to bi-directionally transfer energy between the traction battery 24 and the accessory electric machine 122. The accessory electric machine 122 may be permanent-magnet AC machine. When the accessory electric machine shaft 124 is rotated (e.g., by the exhaust turbine 118), the accessory electric machine 122 may be operated to function as a generator. When electrical energy is used to rotate the accessory electric machine shaft 124, the accessory electric machine 122 functions as a motor. A speed sensor may be coupled to the accessory electric machine shaft 124 and configured to provide a signal indicative of the shaft speed. The speed sensor may be an encoder, a resolver, or other sensor suitable for measuring rotational speed.

The flow of exhaust gas through the first exhaust manifold 112 and the second exhaust manifold 114 may affect performance of the engine 18. If the flow of exhaust gas is too restricted, back pressure may affect operation of a piston in the cylinder 104. The flow of exhaust gas may also impact a subsequent intake cycle if exhaust gas is not sufficiently cleared from the cylinder 104. The first exhaust manifold 112 and the second exhaust manifold 114 may be configured to adjust the flow rate of exhaust gas to balance these and other considerations. For example, the exhaust turbine 118 may restrict the flow rate of exhaust gas through the first exhaust manifold 112. The timing of opening and closing of the first exhaust valve 108 and the second exhaust valve 110 may be adjusted to minimize pumping losses and thereby optimize fuel economy.

The accessory electric machine 122 may be coupled to an A/C compressor 130. The accessory electric machine shaft 124 may be coupled to an A/C compressor shaft 140. The accessory electric machine 122 may be coupled to the A/C compressor 130 via a gearset 126 and/or a clutch 128. The accessory electric machine shaft 124 may be coupled to the gearset 126 which may be configured to adjust a speed or torque ratio between the accessory electric machine shaft 124 and the A/C compressor shaft 140. In some configurations, the gearset 126 may be a planetary gear set. One of the gears of the planetary gearset may be coupled to a compressor clutch 128 that holds the gear stationary when the compressor clutch 128 is actuated. In some configurations, the gearset 126 may have a gearset output shaft 138 that is coupled to the compressor clutch 128. The compressor clutch 128 may couple the output of the gearset 126 to the A/C compressor shaft 140. Rotation of the A/C compressor shaft 140 operates the A/C compressor 130.

When operating as a generator, the accessory electric machine shaft 124 may be driven by rotation of the exhaust turbine 118. Currents induced in the accessory electric machine 122 may be converted by the accessory power electronics module 132 to DC voltage levels compatible with the traction battery 24. When operating as a motor, the accessory electric machine shaft 124 is driven by electrical energy from the traction battery 24. The accessory power electronics module 132 may convert DC voltage of the traction battery 24 to AC currents in the accessory electric machine 122.

The system disclosed allows for distinct modes of operation. A first mode may be an A/C compressor 130 direct drive mode. When the engine 18 is running, the exhaust turbine 118 may be rotating as exhaust gas flows through the first exhaust manifold 112. In this mode, the A/C compressor 130 may be driven by exhaust turbine 118. The turbine clutch 120 may be engaged so that the exhaust turbine shaft 136 is coupled to the accessory electric machine shaft 124. When the clutch 128 is engaged, the accessory electric machine shaft 124 is coupled to the A/C compressor shaft 140. This mode of operation allows the A/C compressor 130 to be operated by the exhaust turbine 118 with no intermediate conversion of mechanical energy to electrical energy.

Further, in this mode, the power to the A/C compressor 130 may be controlled by operating the accessory electric machine 122. When the exhaust turbine 118 generates more power than needed to drive the A/C compressor 130, the accessory electric machine 122 may be operated as a generator. The excess power may be converted to electrical energy to charge the traction battery 24 or power other high-voltage loads. For example, if the exhaust turbine 118 generated power is 5 kW and the A/C compressor 130 uses 3 kW, then 2 kW may be converted to electrical energy.

This direct mechanical path for driving the A/C compressor 130 is beneficial because it eliminates the intermediate conversion to electrical energy and back. Further, excess energy may be captured from the engine exhaust stream that is normally wasted.

A second mode of operation may be an electric drive mode for the A/C compressor 130. In situations in which the engine 18 is not running, the accessory electric machine 122 may be used to drive the A/C compressor 130. In this mode of operation, the exhaust turbine 118 may not be rotating as there is no engine exhaust. The accessory electric machine shaft 124 may be rotated by operating the accessory electric machine 122 as a motor using power from the traction battery 24. The turbine clutch 120 may prevent rotation of the exhaust turbine shaft 136 which would add to inertia driven by the accessory electric machine 122. To operate the A/C compressor 130, the compressor clutch 128 may be engaged to couple the accessory electric machine shaft 124 and the A/C compressor shaft 140. In this mode, the A/C compressor 130 may be operated using power from the traction battery 24. The accessory electric machine 122 operation mode is beneficial as it allows operation of the A/C compressor 130 while the engine 18 is stopped.

A third mode of operation may be a power generation mode. In situations in which the engine 18 is running and the A/C compressor 130 is not used, the exhaust turbine 118 may be used to provide electrical energy. In this mode, the compressor clutch 128 may be disengaged so that the A/C compressor shaft 140 and the accessory electric machine shaft 124 are decoupled. In this mode, the exhaust turbine shaft 136 may be rotating and the turbine clutch 120 may be engaged. The accessory electric machine shaft 124 may rotate with the exhaust turbine shaft 136 causing the accessory electric machine 122 to operate as a generator. The electrical energy may be transferred to the traction battery 24 or used to operate high-voltage loads. The electrical energy generation mode is beneficial as additional electrical energy is generated. Energy from the engine exhaust stream that is normally wasted is captured.

One or more controllers 134 may be included to control operation of the system. The controller 134 may control operation of the accessory power electronics module 132 and the compressor clutch 128. The A/C compressor 130 may be used to build pressure in refrigerant lines of a thermal system. The thermal system may include a pressure sensor in the in the refrigerant lines. The pressure sensor may output a signal indicative of the pressure in the A/C lines. The controller 134 may monitor the pressure signal to determine if the A/C compressor is to be operated.

The controller 134 may determine if operation of the A/C compressor 130 is demanded. Operation of the A/C compressor 130 may be requested based on a setting of the cabin heating/cooling system. In some configurations, the A/C compressor 130 may be requested for active cooling of vehicle components, such as the traction battery 24.

Based on the pressure signal, the speed of the A/C compressor 130 may be controlled to maintain the pressure at a desired level or within a particular range. A control loop may be implemented in the controller 134 to control the speed of the A/C compressor 130 based on a pressure error. The control loop may output a torque or speed request to the accessory electric machine 122. In some configuration, the A/C compressor 130 may be operated at a predetermined speed. Based on the request and the pressure signal, the controller 134 may determine an amount of power necessary to drive the A/C compressor 130.

The controller 134 may determine an amount of power that the exhaust turbine 118 is generating. The controller 134 may determine the exhaust turbine power based on a shaft speed. For example, the speed of the accessory electric machine shaft 124 may be measured and used to compute the exhaust turbine speed. The exhaust turbine power may be computed based on the shaft speed and an engine speed based on a pre-calibrated lookup table. The pre-calibrated lookup table may be stored in non-volatile memory of the controller 134.

In the power generation mode, the accessory electric machine 122 may be operated in a speed-control loop. A desired speed of the accessory electric machine shaft 124 may be maintained. The desired speed may be based on an engine speed. The desired speed may be based on a predetermined speed of the exhaust turbine shaft 136. The desired speed may be optimized for electricity generation to improve overall efficiency. When operating in the speed-control loop, torque limits on the accessory electric machine 122 may be set to ensure that the speed of exhaust turbine 118 is not excessively reduced from a normal operating range. Further, the torque limits may be adjusted based on a state of charge of the traction battery 24. For example, at a predetermined maximum state of charge, the traction battery 24 may not be able to accept further charge. Near the maximum state of charge, the torque limits may be reduced to decrease the amount of energy produced by the accessory electric machine 122.

The controller 134 may determine the exhaust turbine power based on an amount of power absorbed when operating the accessory electric machine 122 as a generator. The controller 134 may estimate the exhaust turbine power based on engine speed and valve timing. The controller 134 may then adjust a command torque to the accessory electric machine 122 to reduce the power converted to electricity and increase the amount of power passed through to the A/C compressor 130.

In some configurations, the accessory electric machine 122 may be operated in a speed-control mode. In the speed-control mode, the shaft speed of the accessory electric machine 122 may be controlled to a predetermined speed. The predetermined speed may be based on the desired speed of the A/C compressor 130. The predetermined speed may be based on the desired speed of the exhaust turbine 118. The predetermined speed may depend on the power demand of the A/C compressor 130 or the desired refrigerant pressure. In the power generation mode, the speed of the accessory electric machine 122 may be selected for best efficiency.

The power of the accessory electric machine 122 may be determined based on a difference between the amount of power demand to drive the A/C compressor 130 and the amount of power generated by the turbine 118. A positive difference may indicate that more power is demanded to drive the A/C compressor 130. This excess power demand may be provided by operating the accessory electric machine 122 as a motor. Based on the speed of the accessory electric motor shaft 124, a torque level for the accessory electric machine 122 may be computed to deliver the power to drive the A/C compressor 130. A negative difference may indicate that some power must be absorbed from turbine 118. Power may be absorbed by operating the accessory electric machine 122 as a generator. Based on the speed of the accessory electric machine shaft 124, a torque level for the accessory electric machine 122 may be computed to absorb the difference.

When operating in a speed control mode, the speed control loop may adjust the torque of the accessory electric machine 122. In a case of the power demand of the A/C compressor 130 being greater than the power generated by the turbine 118, the speed of the accessory electric machine 122 may fall below the predetermined speed setpoint. The speed control loop may detect the error and adjust the torque of the accessory electric machine 122 to increase the speed (e.g., operate as a motor). In a case of the power demand being less than the power generated, the speed of the accessory electric machine 122 may rise above the predetermined speed setpoint. The speed control loop may detect the error and adjust the torque of the accessory electric machine 122 to decrease the speed (e.g., operate as a generator).

Figure 3:
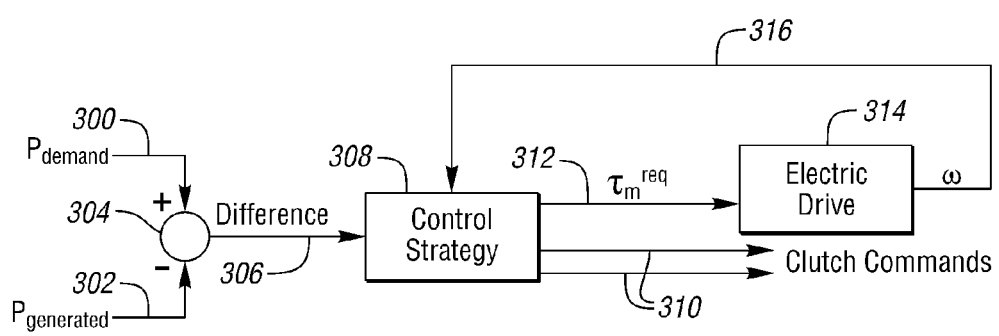
FIG. 3 is a block diagram representing a control system for controlling the electric machine.

FIG. 3 depicts a block diagram of a potential control scheme for the system. A difference element 304 may output the difference 306 between the power demand 300 of the A/C compressor 130 and the power generated 302 by the exhaust turbine 118. The difference 306 may be input to a control strategy 308. The control strategy may implement a control algorithm based on the difference 306. An electric machine torque request 312 may be output from the control strategy 308 to the electric drive system 314. The electric drive system 314 may represent the operation of the accessory power electronics module 132 and the accessory electric machine 122 coupled to the exhaust turbine 118 and the A/C compressor 130. The electric drive system 314 may operate the electric machine in an appropriate manner to generate the requested torque 312. The output of the electric drive system 314 may be an electric machine speed 316. The electric machine speed 316 may be an input to the control strategy. The control strategy 308 may further output clutch commands 310 to operate the turbine clutch 120 and the compressor clutch 128. The system depicted is merely representative of a system to control the accessory electric machine 122. Other representations are possible. As discussed herein, the power demand 300 and power generated 302 signals may be replaced or supplemented by speed setpoints and a speed control loop.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a compressor;
    a turbine disposed within a path of a split-exhaust system of an engine;
    an electric machine mechanically coupled to the compressor and the turbine; and
    a controller programmed to operate the electric machine as a motor to drive the compressor in response to a difference between a power demand of the compressor and a power generated by the turbine being positive and as a generator to generate electrical power in response to the difference being negative.

2. The vehicle of claim 1 wherein the controller is further programmed to operate a clutch that couples the electric machine to the compressor based on a requested power demand of the compressor.

3. The vehicle of claim 2 wherein the controller is further programmed to, in response to the requested power demand being zero, disengage the clutch.

4. The vehicle of claim 1 wherein the controller is further programmed to, in response to the power demand being greater than zero when the engine is in a shutdown condition, disengage a clutch between the turbine and the electric machine.

5. The vehicle of claim 1 wherein the power demand is based on a pressure of an air conditioning system.

6. A vehicle comprising:
    a compressor;
    a turbine driven by exhaust of an engine;
    an electric machine coupled to the compressor and the turbine; and
    a controller programmed to, in response to the engine being auto-stopped, operate the electric machine as a motor to drive the compressor and, in response to a power demand of the compressor being zero while the engine is running, operate the electric machine as a generator driven by the turbine.

7. The vehicle of claim 6 wherein the controller is further programmed to, in response to a power demand of the compressor being greater than a power output by the exhaust turbine, operate the electric machine as a motor to drive the compressor based on a difference between the power demand of the compressor and the power output of the exhaust turbine.

8. The vehicle of claim 6 wherein the controller is further programmed to, in response to a power demand of the compressor being less than a power output by the exhaust turbine, operate the electric machine as a generator to generate electric power based on a difference between the power output of the exhaust turbine and the power demand of the compressor.

9. The vehicle of claim 6 further comprising a clutch configured to couple the electric machine to the compressor, wherein the controller is further programmed to operate the clutch based on the power demand for the compressor.

10. The vehicle of claim 9 wherein the controller is further programmed to, in response to the power demand being greater than zero, engage the clutch.

11. The vehicle of claim 6 further comprising a clutch configured to couple the exhaust turbine to the electric machine, wherein the controller is further programmed to engage the clutch in response to the engine running.

12. The vehicle of claim 11 wherein the controller is further programmed to disengage the clutch in response to the engine stopping.

13. The vehicle of claim 11 wherein the controller is further programmed to, in response to a state of charge of a traction battery that is coupled to the electric machine being greater than a predetermined threshold, disengage the clutch.

14. A method comprising:
    causing, by a controller, an electric machine to operate as a motor, wherein the electric machine is coupled between an exhaust turbine and a compressor and is operable to drive the compressor, in response to a difference between a power demand of the compressor and a power generated by the exhaust turbine being positive; and
    causing, by the controller, the electric machine to operate as a generator to convert the difference to electrical energy in response to the difference being negative.

15. The method of claim 14 further comprising operating, by the controller, a clutch between the electric machine and the compressor based on the difference.

16. The method of claim 14 further comprising operating, by the controller, a clutch between the exhaust turbine and the compressor based on the power generated by the exhaust turbine.

* * * * *